(12) United States Patent
Igarashi et al.

(10) Patent No.: US 8,310,968 B2
(45) Date of Patent: Nov. 13, 2012

(54) ACCESS POINT, WIRELESS COMMUNICATION STATION, WIRELESS COMMUNICATION SYSTEM AND WIRELESS COMMUNICATION METHOD

(75) Inventors: Kei Igarashi, Yokohama (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 12/555,312

(22) Filed: Sep. 8, 2009

(65) Prior Publication Data

US 2010/0110962 A1   May 6, 2010

(30) Foreign Application Priority Data

Sep. 9, 2008   (JP) ............................... P2008-231056

(51) Int. Cl.
*G08C 17/00* (2006.01)
(52) U.S. Cl. ....................................... 370/311; 370/312
(58) Field of Classification Search .................. 370/311, 370/312
See application file for complete search history.

(56) References Cited

U.S. PATENT DOCUMENTS

| | | | |
|---|---|---|---|
| 2005/0254444 A1 | 11/2005 | Meier et al. | |
| 2005/0276237 A1 | 12/2005 | Segal et al. | |
| 2009/0252165 A1* | 10/2009 | Zhang et al. | 370/390 |
| 2010/0189021 A1* | 7/2010 | He et al. | 370/311 |

FOREIGN PATENT DOCUMENTS

| | | |
|---|---|---|
| CN | 1947357 A | 4/2007 |
| EP | 2 048 823 A1 | 4/2009 |
| JP | 2006-501721 | 1/2006 |
| JP | 2006-527538 | 11/2006 |
| JP | 2007-288728 | 11/2007 |
| JP | 2009-5114 | 1/2009 |
| JP | 2009-5118 | 1/2009 |
| JP | 2010-519875 | 6/2010 |
| JP | 2011-501488 | 1/2011 |
| WO | WO 2004/029770 A2 | 4/2004 |
| WO | WO 2004/111763 A2 | 12/2004 |
| WO | WO 2008/104095 A1 | 9/2008 |

OTHER PUBLICATIONS

"Wireless LAN Medium Access Control (MAC) and Physical Layer (PHY) Specifications", ANSI/IEEE Std 802.11, 1999 Edition, IEEE, Aug. 20, 1999, 528 pages.
Extended Search Report issued Dec. 13, 2010 in EP Application No. 09169862.1.

(Continued)

*Primary Examiner* — Albert T Chou
(74) *Attorney, Agent, or Firm* — Oblon, Spivak, McClelland, Maier & Neustadt, L.L.P.

(57) ABSTRACT

The present invention implements an intermittent reception method with which a portable station that does not receive a multicast service does not enter the Awake state unnecessarily. A packet buffer portion buffers a received packet in such a memory as RAM and recording device, and judges whether the buffered packet is a multicast packet. When the packet buffer unit judges that the packet buffered by the packet buffer unit is a multicast packet, a DTIM beacon generation unit generates a DTIM beacon in which multicast notification data indicating that the multicast packet is buffered is set. A packet transmission unit transmits the DTIM beacon generated by the DTIM beacon generation unit to wireless communication stations or the like.

14 Claims, 10 Drawing Sheets

OTHER PUBLICATIONS

"IEEE Standard for Information Technology—Telecommunications and Information Exchange Between Systems—Local and Metropolitan Area Networks-Specific Requirements—Part 11: Wireless LAN Medium Access Control (MAC) and Physical Layer (PHY) Specifications", IEEE Std 802.11-2007 (Revision of IEEE Std 802.1-1999), XP017604022, 1231 pages.

Chinese Office Action issued Mar. 7, 2012 in patent application No. 200910168365.4 with English translation.

Japanese Office Action issued Apr. 17, 2012, in Patent Application No. 2008-231056 (with English-language translation).

$2^{nd}$ Notification of Chinese Office Action issue Aug. 1, 2012 in Chinese Patent Application No. 200910168365.4 with Enlish translation, 13 pages.

\* cited by examiner

ACCESS POINT, WIRELESS COMMUNICATION STATION, WIRELESS COMMUNICATION SYSTEM AND WIRELESS COMMUNICATION METHOD

BACKGROUND OF THE INVENTION

1. Field of the Invention

The present invention relates to an access point, wireless communication station, wireless communication system and wireless communication method.

2. Related Background Art

Recently wireless LAN interfaces are installed in various devices. In particular, the popularization of the IEEE 802.11 standard for personal computers, home electronic products and portable terminals is remarkable. IEEE 802.11 is a standard that specifies the wireless LAN technology for layer 2, particularly for the MAC or lower layers. When a portable terminal is used as a station based on IEEE 802.11, the technology to implement power saving is critical. In Non-patent Document 1, a following method to implement power saving in a station according to IEEE 802.11 is used. First an overview of an intermittent reception method in a station according to IEEE 802.11 will be described. In IEEE 802.11, two types of intermittent reception methods, that is an intermittent reception method for a unicast packet, and an intermittent reception method for a broadcast/multicast packet, are specified.

FIG. 1 shows the intermittent reception method for a unicast packet. FIG. 1 is a timing chart depicting a conventional packet transmission processing. As FIG. 1 shows, an access point AP1a periodically sends a beacon P1 to a wireless communication station STA1a. The wireless communication station STA1a during intermittent reception wakes up (turns ON the wireless LAN interface) immediately before a beacon transmission schedule time, and receives the beacon P1. In the beacon P1, "0" or "1" data is set for each AID (Association ID). This data indicates whether a unicast packet P2 corresponding to each AID is buffered in an access point AP1a or not. The AID and "0" or "1" data, which is set for each AID, are called a "bit map". Here the AID is a characteristic value which the access point AP1a allocates to a wireless communication station STA1a when a wireless communication station STA1a is connected to the access point AP1a, and a value in the "1" to "2007" range is used. In other words, a bit for AID includes the 1st to 2007th bit. The wireless communication station STA1a, which receives the beacon P1, maintains the Awake state (the wireless LAN interface conforming to IEEE 802.11 standard is in the ON state, and communication operation is in the drive state) if the received beacon P1 is referred to and "1" is set in the bit for AID allocated to the local station (wireless communication station STA1a), and sends PS-Poll, which is a packet to request transfer of the unicast packet P2, to the access point AP1a.

The period when the wireless communication station STA1a is in the Awake state is shown by the symbol T1 in FIG. 1. The period when the wireless communication station STA1a is in the Doze state (the wireless LAN interface conforming to IEEE 802.11 is in the OFF state and the communication operation is in the pause state) is a period other than the periods indicated by the symbol T1 in FIG. 1. The access point AP1a, which received the PS-Poll, returns Ack1 (Ack: acknowledge) to the wireless communication station STA1a, which is the transmission source of the PS-Poll, and sends a buffered unicast packet P2 to the wireless communication station STA1a. The wireless communication station STA1a receives the unicast packet P2 from the access point AP1a, and returns Ack2 to AP1 after reception, and transits to the Doze state. On the other hand, the wireless communication station STA1a which received the beacon P1 immediately transits to the Doze state if the received beacon P1 is referred to and "0" is set in the bit for AID allocated to the local station (wireless communication station STA1a). By the above operation, the unicast packets are intermittently received.

Now the intermittent reception method for a broadcast/multicast packet (means a broadcast packet or a multicast packet, the same herein below) specified in IEEE 802.11, will be described with reference to FIG. 2. FIG. 2 is a timing chart depicting a conventional packet transmission processing. As FIG. 2 shows, an access point AP1a periodically sends a DTIM beacon P3 (DTIM: Delivery Traffic Indication Message) to a wireless communication station STA2. The DTIM beacon P3 is a special beacon which is sent for a predetermined number of beacons. Therefore the transmission cycle of the DTIM beacon P3 is a beacon cycle multiplied by a natural number. Normal beacons are omitted in FIG. 2. The wireless communication station STA2 during intermittent reception wakes up immediately before the transmission schedule time of the DTIM beacon P3, and receives the DTIM beacon P3. The DTIM beacon P3 includes the above mentioned bit map for AID, which is used for notifying a unicast packet buffering, just like a normal beacon, and additionally includes a No. 0 bit for AID.

The No. 0 bit for AID of the DTIM beacon P3 is created for notifying the buffering of a broadcast/multicast packet. In the No. 0 bit for AID of the DTIM beacon P3, "1" is set if the broadcast/multicast packet P4 is buffered in the access point AP1a, or "0" is set if the broadcast/multicast packet P4 is not buffered in the access point AP1a. The wireless communication station STA2, which received the DTIM beacon P3, maintains the Awake state if "1" is set in the No. 0 bit for AID, and waits for the transmission of a broadcast/multicast packet P4 from the access point AP1a.

The broadcast/multicast packet P4, which is transmitted from the access point AP1a, consists of one or more packets. In the last packet, out of one or more packets constituting the broadcast/multicast packet P4, data to indicate this information (that is, this is the last packet, and there is no more buffered broadcast/multicast packet P4 hereafter) is set. When the last packet out of one or a plurality of packets constituting the broadcast/multicast packet P4 is received, the wireless communication station STA2 transits to the Doze state. Ack in the MAC layer according to IEEE 802.11 is transmitted/received when a unicast packet is transmitted/received, but is not transmitted/received when a broadcast/multicast packet is transmitted/received. The wireless communication station STA2 which received the DTIM beacon P3 immediately transits to the Doze state if "0" is set in the No. 0 bit for AID.

[Non-patent Document 1] ANSI/IEEE Std 802.11, 1999 Edition (R2003) Information technology—Telecommunications and information exchange between systems—Local and metropolitan area networks—Specific requirements—Part 11: Wireless LAN Medium Access Control (MAC) and Physical Layer (PHY) Specifications

SUMMARY OF THE INVENTION

The above is the specification of IEEE 802.11, but if a station which receives a multicast packet and a station which does not receive a multicast packet coexist in a plurality of stations which are connected to one access point for communication, the following problem occurs. This problem will now be described with reference to FIG. 3. FIG. 3 is a timing chart depicting a conventional packet transmission processing. It is assumed that wireless communication stations STA1*a*, 2*a* and 3*a*, which are operating in the intermittent reception mode, are connected to one access point AP1*a* for communication. The wireless communication stations STA1*a* and STA2*a* shown in FIG. 3 are stations which receive a multicast packet P5, and the wireless communication station STA3*a* shown in FIG. 3 is a station which does not receive the multicast packet P5. If the multicast packet P5 is buffered at the DTIM beacon transmission schedule time, the access point AP1*a* sets "1" in the No. 0 bit, and sends the DTIM beacon P3. All of the wireless communication stations STA1*a*, 2*a* and 3*a*, which received this DTIM beacon P3, maintain the Awake state until a multicast packet P5 is sent from the access point AP1*a*, since "1" is set in the No. 0 bit for AID.

In this case the following problem occurs. The wireless communication stations STA1*a* and 2*a*, which are terminals to receive the multicast packet P5, need to maintain the Awake state. The wireless communication station STA3*a*, however, is a terminal which does not receive the multicast packet P5, and therefore need not maintain the Awake state, yet still must enter the Awake state during this multicast packet reception period (period when the wireless communication stations STA1*a* and 2*a* are in the Awake state so as to receive the multicast packet P5), hence unnecessary power is wasted. With the foregoing in view, it is an object of the present invention to implement an intermittent reception method with which a portable station not receiving the multicast service does not enter the Awake state unnecessarily.

An access point of the present invention is an access point for performing wireless communication with one or more wireless communication stations, based on a packet transmission system which allocates wireless bands by CSMA/CA (Carrier Sense Multiple Access with Collision Avoidance), comprising: packet reception unit for receiving a packet from an external communication network; buffering unit for buffering the packet received by the packet reception unit in a memory; buffering judgment unit for judging whether the packet buffered by the buffering unit is a multicast packet or not; beacon generation unit for generating a beacon, in which multicast notification data indicating that a multicast packet is buffered is set, when the buffering judgment unit has judged that the packet buffered by the buffering unit is a multicast packet; and beacon transmission unit for transmitting the beacon generated by the beacon generation unit to the one or more of wireless communication stations. According to the above mentioned access point, whether the access point buffers a multicast packet or not can be judged depending on whether multicast notification data is set in the beacon. In the case of when a wireless communication station does not receive a multicast packet, this wireless communication station, which does not have to receive the multicast packet, can immediately shift from the drive state to the pause state if the multicast notification data is set in the beacon, hence power consumption can be decreased.

In the access point of the present invention, the beacon generation unit sets the multicast notification data in the beacon using a predetermined bit of the beacon for indicating that a broadcast packet or a multicast packet is buffered. Since the multicast notification data is set using a predetermined bit of the beacon, the wireless communication station can use the multicast notification data, and therefore can judge whether the multicast packet is buffered in the access point or not using the multicast notification data.

In the access point of the present invention, the beacon generation unit may set the multicast notification data in the beacon using a bit for an association ID of the beacon. Since the multicast notification data is set using a bit for an association ID of the beacon, relatively large multicast data, sufficient to specify a plurality of multicast packets, can be used without a major change in frame format.

In the access point of the present invention, the multicast notification data may include data indicating a part or all of an address of a multicast packet buffered by the buffering unit. Since a part or all of the multicast packet can be used for the multicast notification data, the multicast notification data can be easily created. Therefore installation can be simplified and load can be decreased.

In the access point of the present invention, the multicast notification data may include multicast notification data of which data volume is smaller than data indicating an address of a multicast packet. Since data, of which data volume is smaller than the data indicating the address of the multicast packet, is used for the multicast notification data, a frame length of the beacon can be decreased compared with the case of using the address of the multicast packet.

In the access point of the present invention, the beacon generation unit may set the multicast notification data in the beacon using a predetermined filed which is included in the beacon excluding the bit for the association ID. Since the multicast notification data is set using a predetermined field which is included in the beacon excluding the bit for the association ID, multicast notification data can be set even if the bit for the association ID is used.

In the access point of the present invention, the beacon generation unit may set the multicast notification data in the beacon using a Length field included in the beacon, or may set the multicast notification data in the beacon by setting all the bits in the Length field to "1". Since the multicast notification data is set using the Length field of the beacon, the multicast notification data can be set without changing the frame format of the beacon.

A wireless communication station of the present invention is a wireless communication station for performing wireless communication with an access point, based on a packet transmission system which allocates wireless bands by CSMA/CA, comprising: communication operation control unit for setting communication operations of the wireless communication performed with the access point to a drive state or a pause state; beacon reception unit for receiving a beacon transmitted from the access point after the communication operation is set to the drive state by the communication operation control unit; and multicast judgment unit for judging whether multicast notification data indicating that a multicast packet is buffered by the access point is set in the beacon received by the beacon reception unit or not, where the communication operation control unit maintains or pauses the communication operation in the drive state after receiving the beacon by the beacon reception unit, according to the judgment result by the multicast judgment unit.

According to the above mentioned wireless communication station, whether the access point buffers a multicast packet or not can be judged depending on whether multicast notification data is set in the beacon or not. In the case of a wireless communication station which does not receive a multicast packet, this wireless communication station, which need not receive the multicast packet, can immediately shift from the drive state to the pause state if the multicast notification data is set in the beacon, hence power consumption can be decreased.

In the wireless communication station of the present invention, the multicast judgment unit may judge whether the multicast notification data is set in the beacon received by the beacon reception unit or not, based on whether all the bits are "1" in the Length field of the beacon received by the beacon reception unit. Since the multicast notification data is set using the Length field of the beacon, the multicast notification data can be set without changing the frame format of the beacon.

A wireless communication system of the present invention is a wireless communication system comprising an access point and one or more wireless communication stations, which perform wireless communication based on a packet transmission system which allocates wireless bands by CSMA/CA, comprising: the access point further comprising: packet reception unit for receiving a packet from an external communication network; buffering unit for buffering the packet received by the packet reception unit in a memory; buffering judgment unit for judging whether the packet buffered by the buffering unit is a multicast packet or not; a beacon generation unit for generating a beacon, in which multicast notification data indicating that a multicast packet is buffered is set, when the buffering judgment unit has judged that the packet buffered by the buffering unit is a multicast packet; and beacon transmission unit for transmitting the beacon generated by the beacon generation unit to the one or more wireless communication stations, where the wireless communication station further comprises: communication operation control unit for setting communication operation of the wireless communication performed with the access point to a drive state or a pause state; beacon reception unit for receiving a beacon transmitted from the access point after the communication operation is set to the drive state by the communication operation control unit; and multicast judgment unit for judging whether the multicast notification data, which indicates that a multicast packet is buffered by the access point, is set in the beacon received by the beacon reception unit or not, and the communication operation control unit maintains or pauses the communication operation in the drive state after receiving the beacon by the beacon reception unit, according to the judgment result by the multicast judgment unit.

According to the above mentioned wireless communication system, whether the access point buffers a multicast packet or not can be judged depending on whether multicast notification data is set in the beacon. In the case when a wireless communication station does not receive a multicast packet, this wireless communication station, which does not have to receive the multicast packet, can immediately shift from the drive state to the pause state if the multicast notification data is set in the beacon, hence power consumption can be decreased.

A wireless communication method of the present invention is a wireless communication method for an access point to perform wireless communication with one or more wireless communication stations, based on a packet transmission system which allocates wireless bands by CSMA/CA, comprising: a packet reception step in which the access point receives a packet from an external communication network of the access point; a buffering step in which the access point buffers the packet received in the packet reception step in a memory of the access point; a buffering judgment step in which the access point judges whether the packet buffered in the buffering step is a multicast packet or not; a beacon generation step in which the access point generates a beacon, in which multicast notification data indicating that a multicast packet is buffered is set, when it was judged that the packet buffered in the buffering step is a multicast packet in the buffering judgment step; and a beacon transmission step in which the access point transmits the beacon generated in the beacon generation step to the one or more wireless communication stations.

A wireless communication method of the present invention is a wireless communication method for a wireless communication station to perform wireless communication with an access point, based on a packet transmission system which allocates wireless bands by CSMA/CA, the method comprising: a beacon reception step in which the wireless communication station receives a beacon transmitted from the access point when the communication operation of the wireless communication station in the wireless communication is a drive state; a multicast judgment step in which the wireless communication station judges whether multicast notification data indicating that a multicast packet is buffered in the access point is set in the beacon received in the beacon reception step; and a communication operation control step in which the wireless communication station maintains or pauses the communication operation in the drive state after the beacon is received in the beacon reception step, according to the judgment result in the multicast judgment step.

A wireless communication method of the present invention is a wireless communication method for an access point and one or more wireless communication stations performing wireless communication based on a packet transmission system which allocates wireless bands by CSMA/CA, the method comprising: a packet reception step in which the access point receives a packet from an external communication network of the access point; a buffering step in which the access point buffers the packet received in the packet reception step in a memory of the access station; a buffering judgment step in which the access point judges whether the packet buffered in the buffering step is a multicast packet or not; a beacon generation step in which the access point generates a beacon, in which multicast notification data indicating that a multicast packet is buffered is set, when judgment is made that the packet buffered in the buffering step, is a multicast packet in the buffering judgment step; a beacon transmission step in which the access point transmits the beacon generated in the beacon generation step to the one or more wireless communication stations; a beacon reception step in which the wireless communication station receives a beacon transmitted from the access point when the communication operation of the wireless communication station in the wireless communication is in the drive state; a multicase judgment step in which the wireless communication station judges whether the multicast notification data indicating that a multicast packet is buffered in the access point is set in the beacon received in the beacon reception step; and a communication operation control step in which the wireless communication station maintains or pauses the communication operation in the drive state after receiving the beacon in the beacon reception step, according to the judgment result in the multicast judgment step.

According to the above mentioned wireless communication method, whether the access point buffers a multicast packet or not can be judged depending on whether multicast notification data is set in the beacon. In the case when a wireless communication station does not receive a multicast packet, this wireless communication station, which does not have to receive the multicast packet, can immediately shift from the drive state to the pause state if the multicast notification data is set in the beacon, hence power consumption can be decreased.

According to the present invention, an intermittent reception method with which a portable station, which does not receive a multicast service does not enter the Awake state unnecessarily, can be implemented.

DESCRIPTION OF THE PREFERRED EMBODIMENTS

Figure 1:
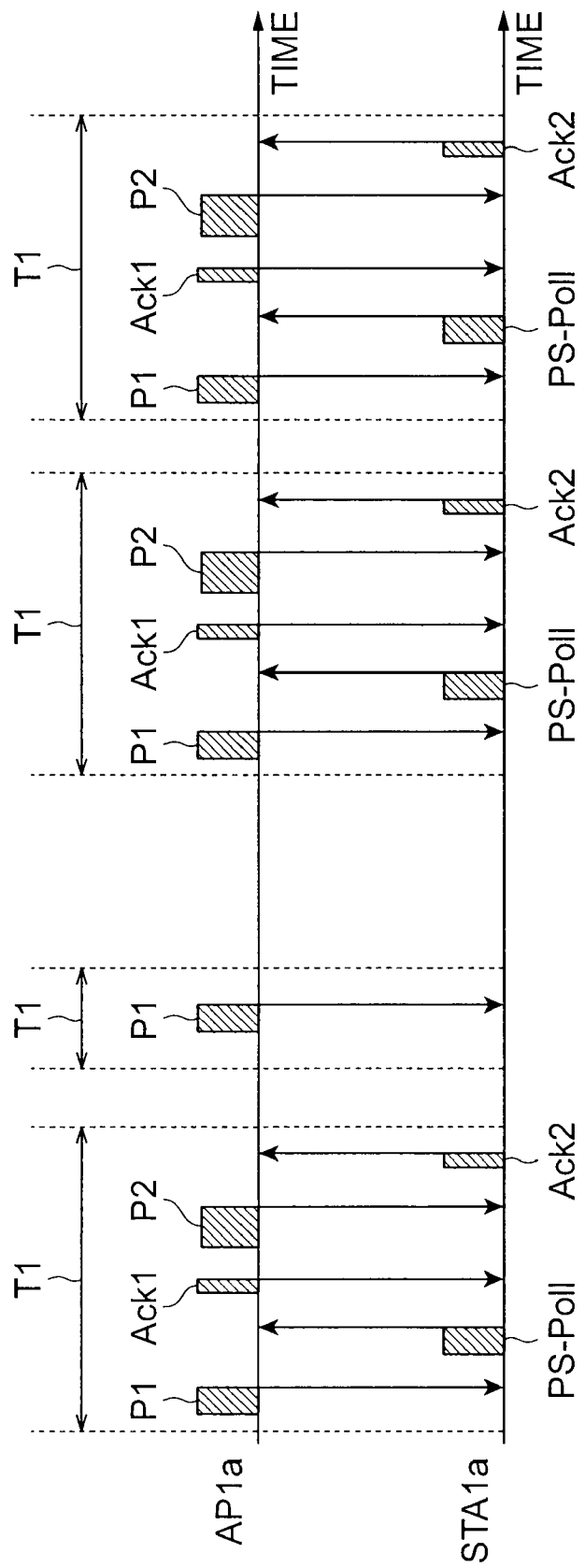
FIG. 1 is a timing chart depicting a state of transmission/reception of packets according to a prior art.
Figure 2:
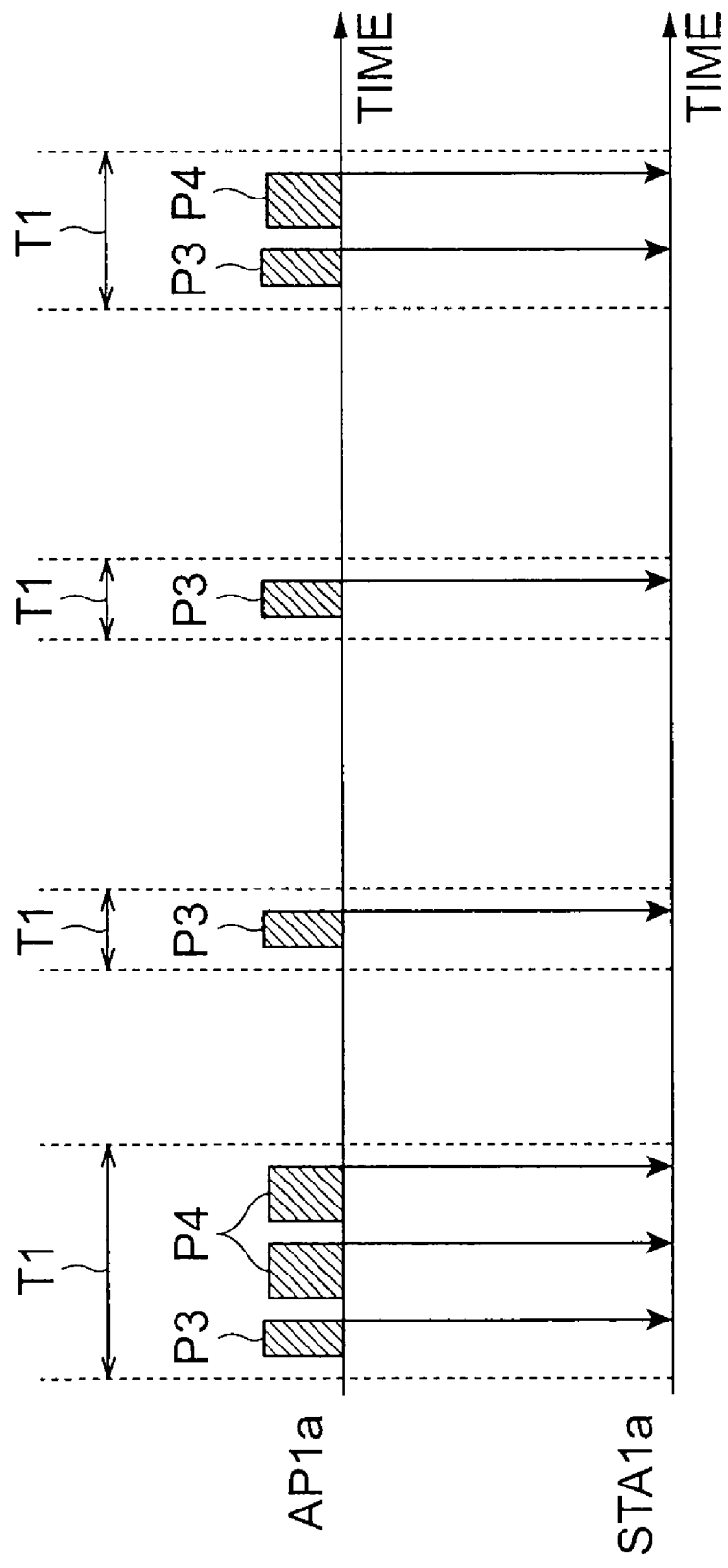
FIG. 2 is a timing chart depicting a state of transmission/reception of packets according to a prior art.
Figure 3:
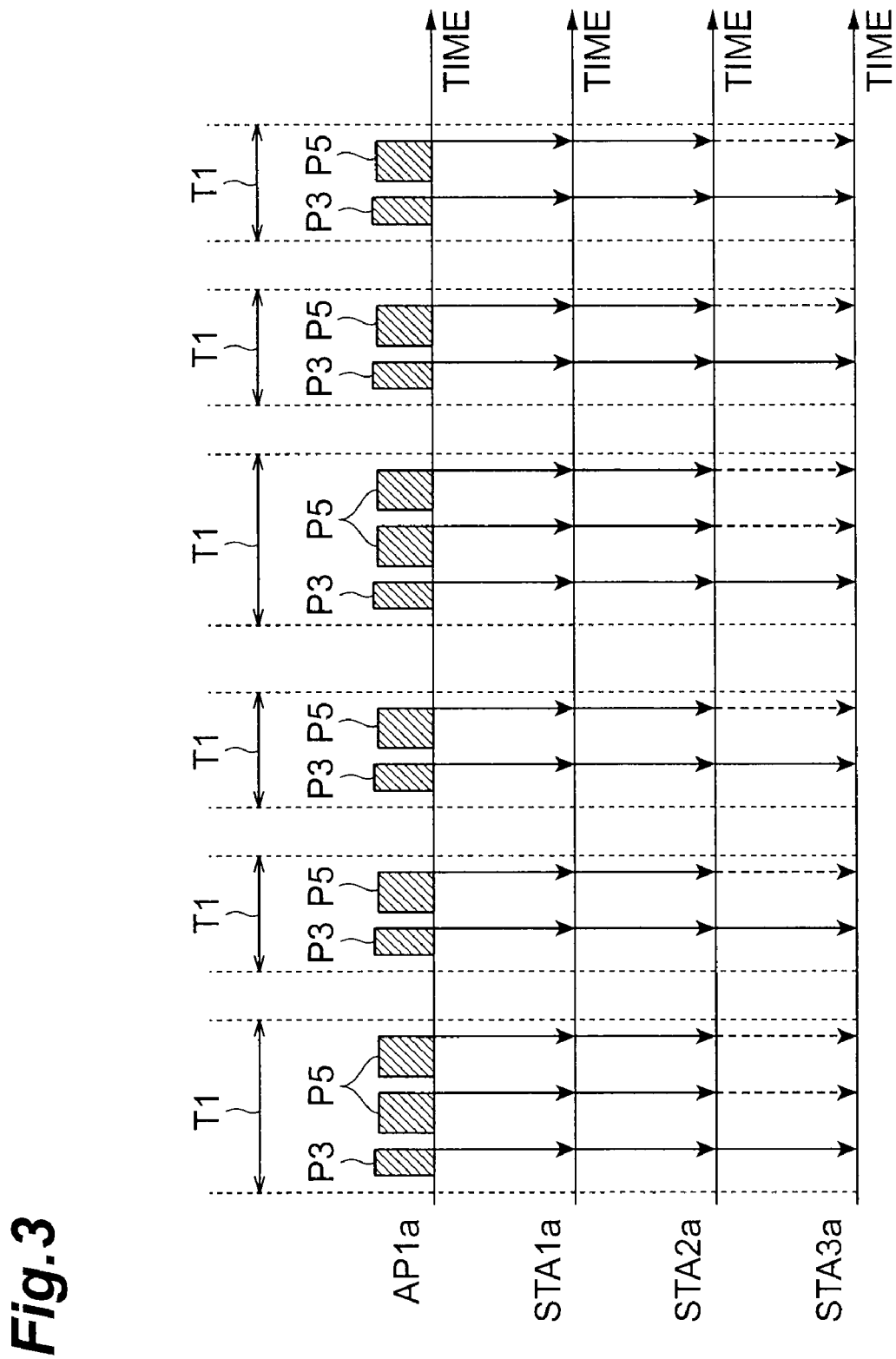
FIG. 3 is a timing chart depicting a state of transmission/reception of packets according to a prior art.
Figure 4:
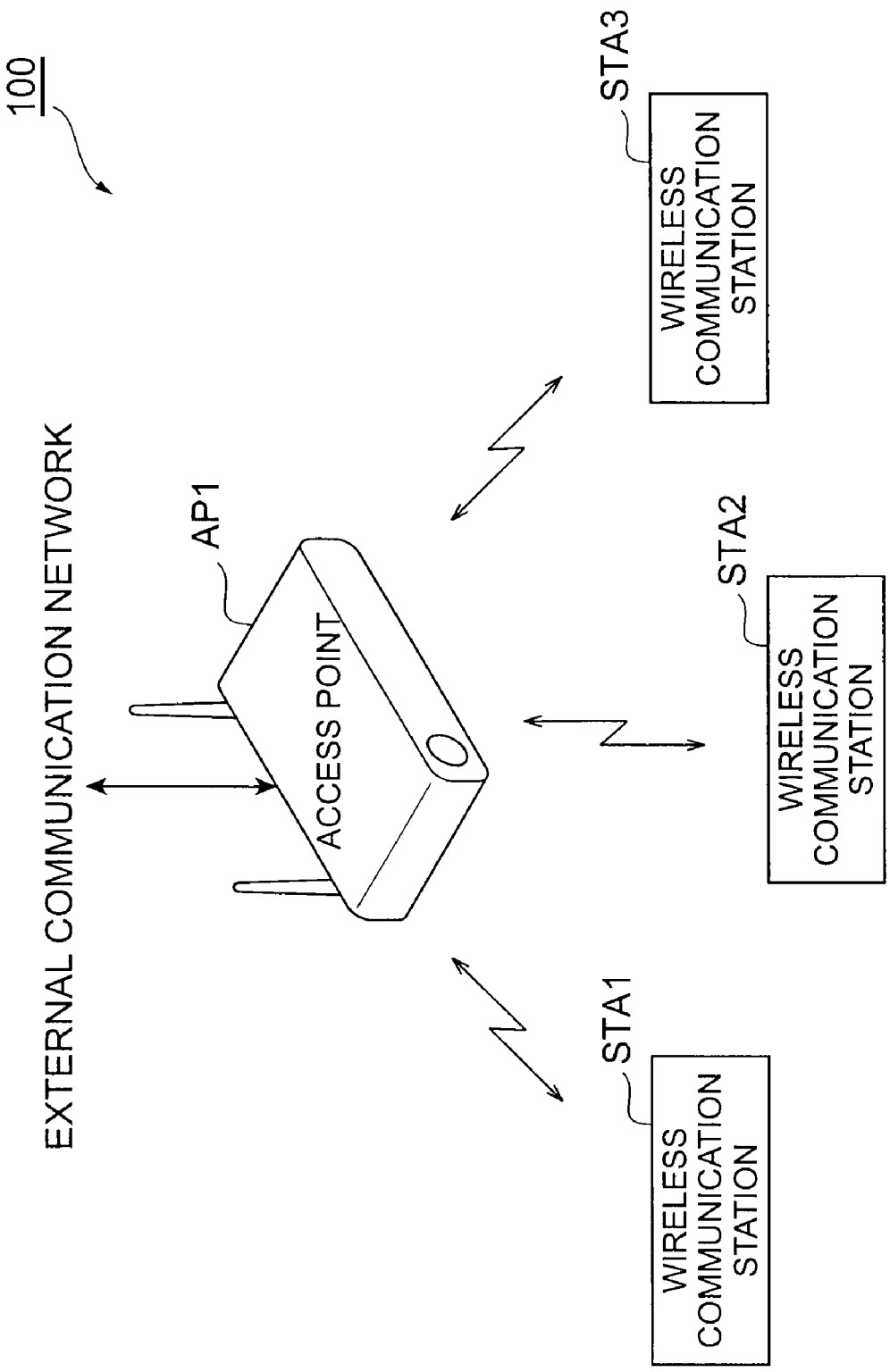
FIG. 4 is a diagram depicting a configuration of a wireless communication system according to an embodiment.

Embodiments of the present invention will now be described with reference to the drawings. In the description of the drawings, the same composing elements are denoted with a same symbol, and redundant description is omitted when possible. A configuration of a wireless communication system 100 according to an embodiment will now be described with reference to FIG. 4. The wireless communication system 100 has an access point AP1 (Access Point) and wireless communication stations STA1, STA2 and STA3. The access point AP1 and wireless communication stations STA1, STA2 and STA3 transmit/receive data via a wireless LAN conforming to the IEEE 802.11 standard. The wireless LAN conforming to the IEEE 802.11 standard performs wireless communication based on a packet transmission system which allocates wireless bands by CSMA/CA. The access point AP1 is connected to an external communication network, receives such data as packets from the external communication network, and distributes this data to the wireless communication stations STA1, STA2 and STA3. The wireless communication stations STA1, STA2 and STA3 are stations conforming to the IEEE 802.11 standard, which are registered in the access point AP1. The wireless communication stations STA1, STA2 and STA3 intermittently receive such data as packets, which are sent from the access point AP1, using a DTIM beacon conforming to the IEEE 802.11 standard, which is sent from the access point AP1. The wireless communication stations STA1, STA2 and STA3 are registered in the access point AP1, so that such data as packets can be received from the access point AP1. Wireless communication stations other than the wireless communication stations STA1, STA2 and STA3 shown in FIG. 4 may also be registered in the access point AP1.

Figure 5:
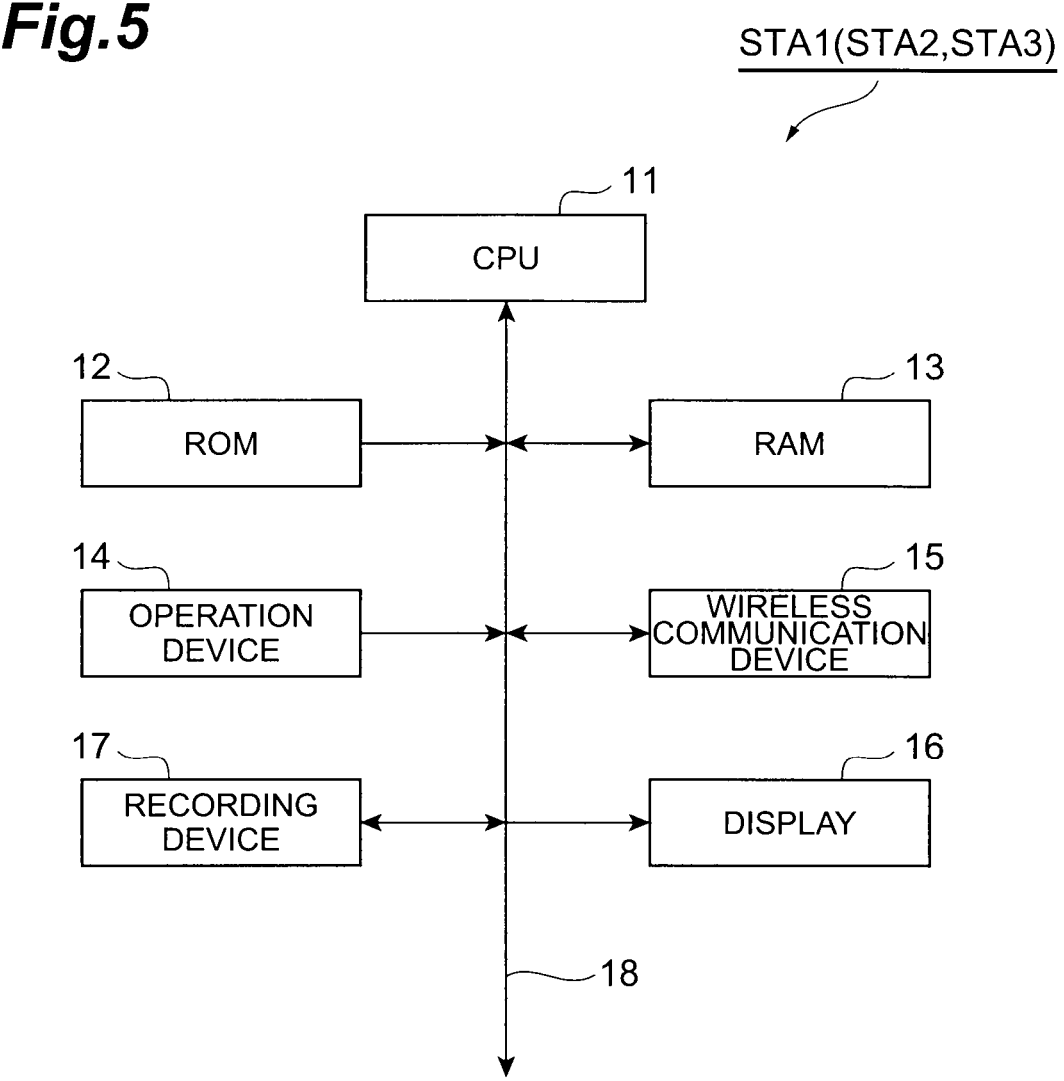
FIG. 5 is a diagram depicting a configuration of a wireless communication station according to an embodiment.

Now a configuration of the wireless communication station STA1 according to the embodiment will be described with reference to FIG. 5 and FIG. 6. The configurations of the wireless communication stations STA2 and STA3 are the same as the configuration of the wireless communication station STA1, so only the configuration of the wireless communication station STA1 will be described herein below. As FIG. 5 shows, the wireless communication station STA1 physically has: a CPU 11, ROM 12, RAM 13, operation device 14, wireless communication device 15, display 16 and recording device 17, which are connected via a bus 18. The CPU 11 comprehensively controls the wireless communication station STA1 by loading predetermined computer software stored on such an internal memory as ROM 12 (including computer programs for executing processing performed by the wireless communication station STA1) to the RAM 13, and executing it. The operation device 14 is a device for inputting data, such as a keyboard, and outputs the input data to the CPU 11. The wireless communication device 15 has an interface for performing wireless communication with the access point AP1 via the wireless LAN conforming to the IEEE 802.11 standard. The display 16 is a display device such as an LCD, and displays the display data sent from the CPU 11. The recording device 17 is a memory which is freely written to/read from, and stores such data as packets received from the access point AP1 or the like.

Figure 6:
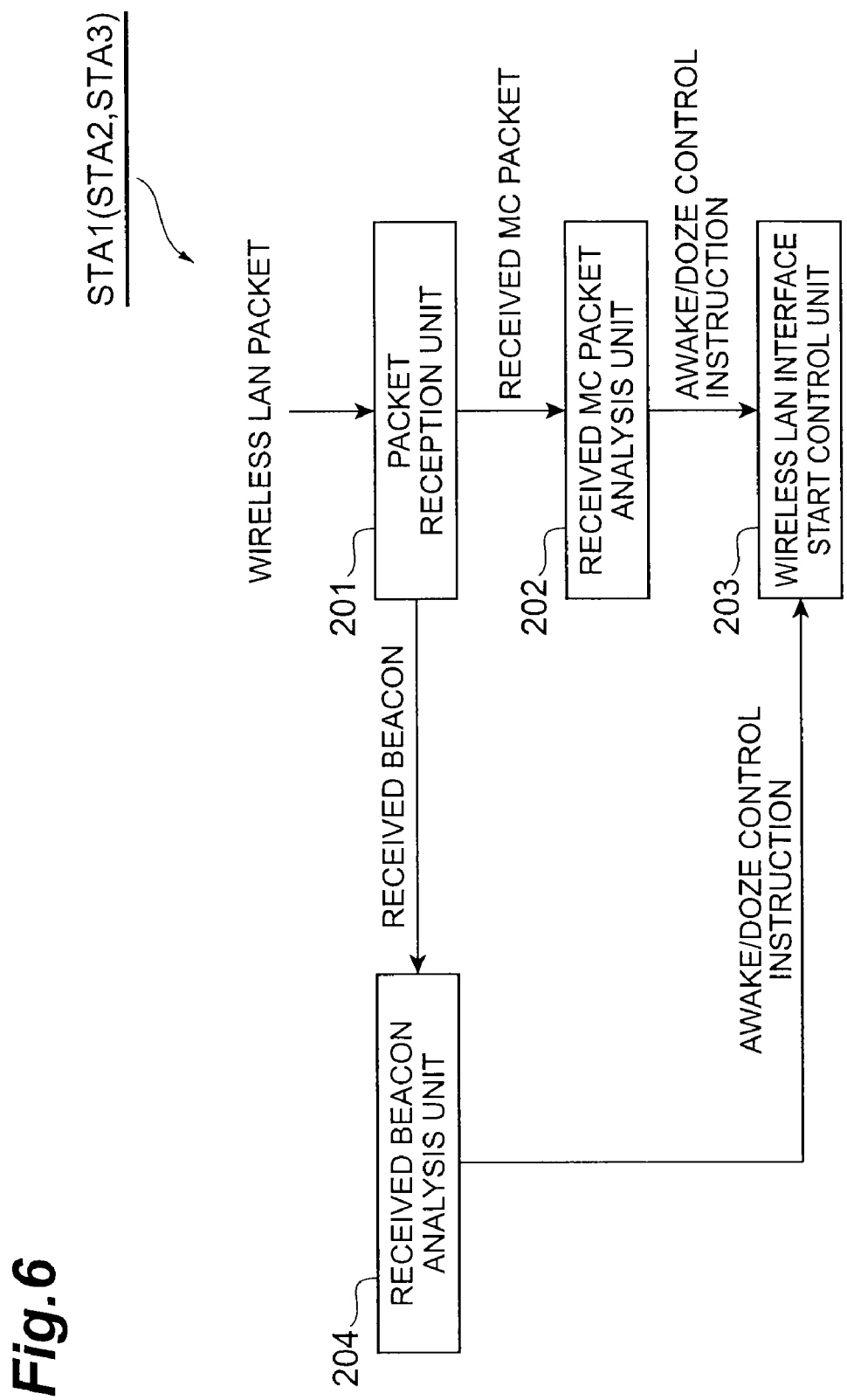
FIG. 6 is a diagram depicting a configuration of a wireless communication station according to an embodiment.

As FIG. 6 shows, the wireless communication station STA1 functionally has a packet reception unit 201 (beacon reception unit), a received MC packet analysis unit 202, a wireless LAN interface start control unit 203 (communication operation control unit) and a received beacon analysis unit 204 (multicast judgment unit). The packet reception units 201 to received beacon analysis unit 204 have functions implemented by the CPU 11 executing the above mentioned computer software stored in such a memory as ROM 12 and recording device 17, so as to operate each composing element of the wireless communication station STA1 shown in FIG. 5. The CPU 11 executes the processing which the wireless communication station STA1 performs, by executing the above mentioned computer software (in particular by using the packet reception unit 201 to received beacon analysis unit 204).

After the communication operation of the wireless communication device 15 enters the Awake state by the wireless LAN interface start control unit 203, the packet reception unit 201 receives data (such as a beacon, DTIM beacon, unicast packet, broadcast packet and multicast packet) from the access point AP1 using the wireless communication device 15. Hereafter a multicast packet received by the packet reception unit 201 may be called a "received MC packet", and a beacon and DTIM beacon received by the packet reception unit 201 may be called a "received beacon". The packet reception unit 201 sends the received MC packet to the received MC packet analysis unit 202 and the received beacon to the received beacon analysis unit 204.

The received MC packet analysis unit 202 analyzes a received MC packet, and determines whether the wireless communication device 15 of the wireless communication station STA1 is set to the Awake state or Doze state. Now the analysis processing performed by the received MC packet analysis unit 202 will be described in concrete terms. The received MC packet analysis unit 202 judges whether data to notify that this packet is the last packet of a series of multicast packets and that no more multicast packets are buffered at this moment is set in the received MC packet or not. If it is judged that this data is set in the received MC packet, the received MC packet analysis unit 202 generates an Awake/Doze control instruction to set the wireless communication device 15 to the Doze state, and sends it to the wireless LAN interface start control unit 203, and if it is judged that this data is not set in the received MC packet, then the received MC packet analysis unit 202 generates an Awake/Doze control instruction to maintain the Awake state of the wireless communication device 15, and sends it to the wireless LAN interface start control unit 203.

The wireless LAN interface start control unit 203 sets the communication operation of the wireless communication performed with the access point AP1 by the wireless communication device 15 to the Awake state or Doze state. In other words, when an Awake/Doze control instruction is received from the received MC packet analysis unit 202 or received beacon analysis unit 204, the wireless LAN interface state control unit 203 controls the communication operation (Awake state or Doze state) of the wireless communication device 15 of the wireless communication station STA1 according to the content of this Awake/Doze control instruction. For example, the wireless LAN interface start control unit 203 sets the communication operation of the wireless communication device 15 of the wireless communication station STA1, after the packet reception unit 201 receiving the DTIM beacon, to maintain the Awake state or to switch to the Doze state according to the judgment result (content of the Awake/Doze control instruction) by the received beacon analysis unit 204.

When a received beacon is received from the packet reception unit 201, the received beacon analysis unit 204 analyzes this received beacon, and decides whether the wireless communication device 15 of the wireless communication station STA1 is set to the Awake state or Doze state based on this analysis result. In other words, the received beacon analysis unit 204 analyzes whether the multicast notification data notification, to indicate a multicast packet is buffered in the access point AP1, is set in the DTIM beacon received by the packet reception unit 201, and decides whether the wireless communication device 15 of the wireless communication station STA1 is set to the Awake state or Doze state based on this analysis result. In the following description, "0" or "1" data, to indicate whether a multicast packet is buffered, and the later mentioned data to indicate an ID (MC identifier) and an address (MC address) of the multicast packet, may be generally called "multicast notification data".

Now the analysis processing performed by the received beacon analysis unit 204 will be described in concrete terms. The received beacon analysis unit 204 judges whether the received beacon is a DTIM beacon and whether the No. 0 bit for AID of this DTIM beacon is set to "0" or "1" (multicast notification data). If it is judged that the No. 0 bit for AID of the received DTIM beacon is set to "1", the received beacon analysis unit 204 recognizes that a broadcast packet is buffered in the access point AP1, and generates an Awake/Doze control instruction to maintain the wireless communication device 15 in the Awake state, and sends it to the wireless LAN interface start control unit 203. If it is judged that the No. 0 bit for AID of the received DTIM beacon is set to "0", the received beacon analysis unit 204 recognizes that a broadcast packet is not buffered, but a multicast packet is buffered in the access point AP1.

According to this recognition result, the received beacon analysis unit 204 judges whether the history data, to indicate that the reception of the multicast packet was set in the access point AP1, is stored in such a memory as RAM 13 and recording device 17. If it is judged that this history data is stored in such a memory as RAM 13 and recording device 17, the received beacon analysis unit 204 generates an Awake/Doze control instruction to maintain the Awake state of the wireless communication device 15 to receive the multicast packet from the access point AP1, and sends the instruction to the wireless LAN interface start control unit 203, and if it is judged that the history data is not stored in such a memory as RAM 13 and recording device 17, then the received beacon analysis unit 204 generates an Awake/Doze control instruction to set the wireless communication device 15 to the Doze state, and sends it to the wireless LAN interface start control unit 203.

A predetermined number of bits (e.g. No. 1 to No. N) out of No. 1 to No. 2007 bits for AID of the DTIM beacon are allocated for the ID (MC identifier) of the multicast packet. For example, if the ID of the multicast packet is "i" ("i" is a natural number in the 1 to N range), the No. i bit is a bit for the AID of the DTIM beacon allocated for the ID of this multicast packet. If a multicast packet of which ID is "i" is buffered in the access point AP1, the No. i bit for AID of the DTIM beacon is set to "1" by the access point AP1, and if not buffered, the No. i bit for AID of the DTIM beacon is set to "0" by the access point AP1. In the case when receiving a multicast packet of which ID is "i" is set in the wireless communication station STA1 like this, (that is, in the case when data to indicate this ID is stored in such a memory as RAM 13 and recording device 17), the received beacon analysis unit 204 judges whether the No. i bit for AID of the DTIM beacon is set to "0" or "1", creates an Awake/Doze control instruction to maintain the wireless communication device 15 of the wireless communication station STA1 in the Awake state, and transfers the instruction to the wireless LAN interface start control unit 203 if it is judged that the No. i bit is set to "1", or creates an Awake/Doze control instruction to set the wireless communication device 15 of the wireless communication station STA1 to the Doze state, and transfers the instruction to the wireless LAN interface start control unit 203 if it is judged that the No. i bit is set to "0".

Here the access point AP1 and the wireless communication station STA1 share the data to indicate a multicast ID. This data may be shared during the association performed between the access point AP1 and the wireless communication station STA1, or may be shared during the negotiation performed between the wireless communication station STA1 and the access point AP1 when a multicast service is started. In either case, when data to indicate an MC address of the multicast packet to be received in the wireless communication station STA1 (stored in such a memory as RAM 13 and recording device 17 of the wireless communication station STA1) is notified from the wireless communication station STA1 to the access point AP1, the access point AP1 allocates an ID (MC identifier) to a multicast packet in this MC address. The access point AP1 stores this data to indicate the MC identifier in such a memory as RAM 23 and recording device 25 of the access point AP1, corresponding with the MC address, and notifies this data to the wireless communication station STA1 along with the data to indicate the MC address.

Figure 7:
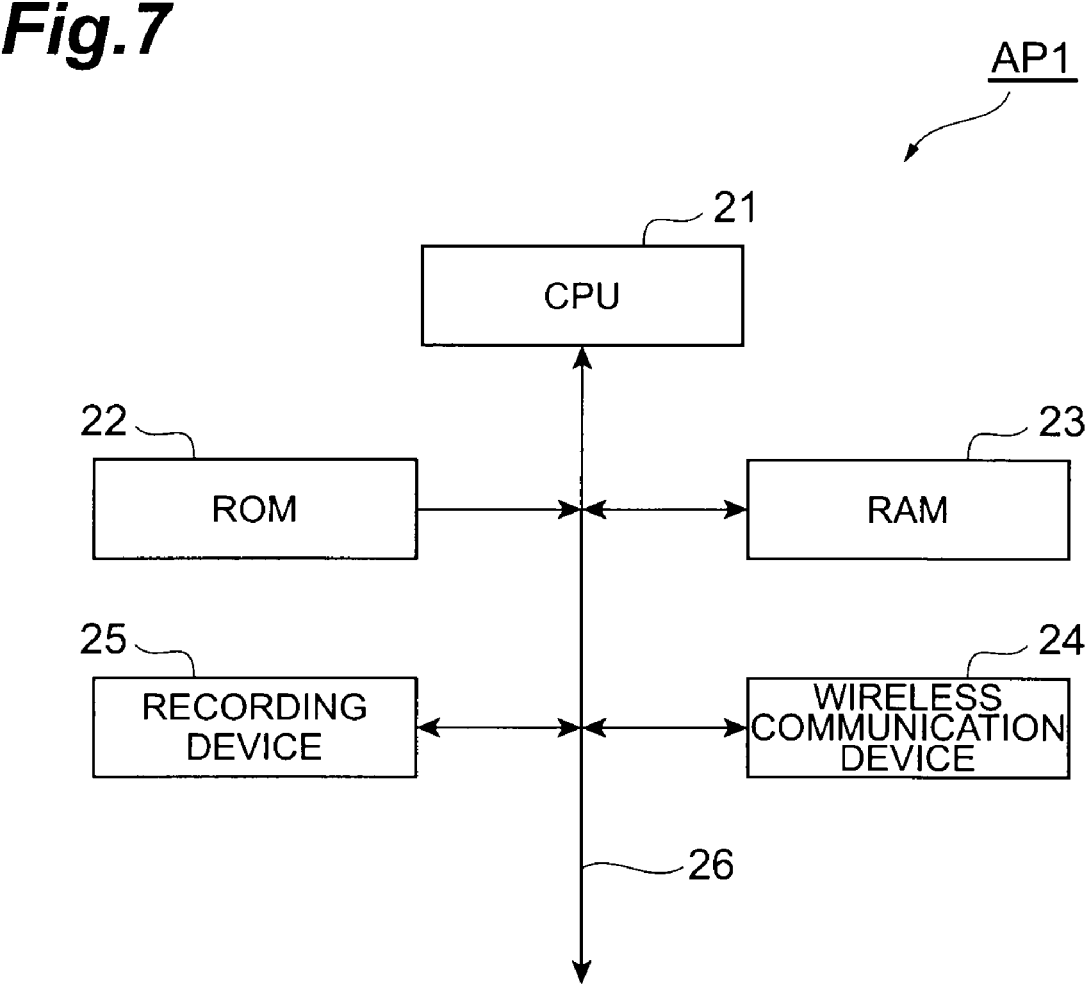
FIG. 7 is a diagram depicting a configuration of an access point according to an embodiment.

Now a configuration of the access point AP1 according to an embodiment will be described with reference to FIG. 7 and FIG. 8. As FIG. 7 shows, the access point AP1 physically has: a CPU 21, ROM 22, RAM 23, wireless communication device 24 and recording device 25, which are connected via a bus 26. The CPU 21 comprehensively controls the access point AP1 by loading a predetermined computer software stored in such an internal memory as ROM 22 (including computer programs for executing processing performed by the access point AP1) to RAM 23, and executing it. The wireless communication device 24 has an interface for performing wireless communication with the wireless communication stations STA1, STA2 and STA3 via the wireless LAN conforming to the IEEE 802.11 standard, and an interface for communicating with an external communication network (communication network connected to a server for providing such data as packets). The recording device 25 is a memory in which reading/writing can be freely performed, and stores such data as packets received from the external communication network by the wireless communication device 24.

Figure 8:
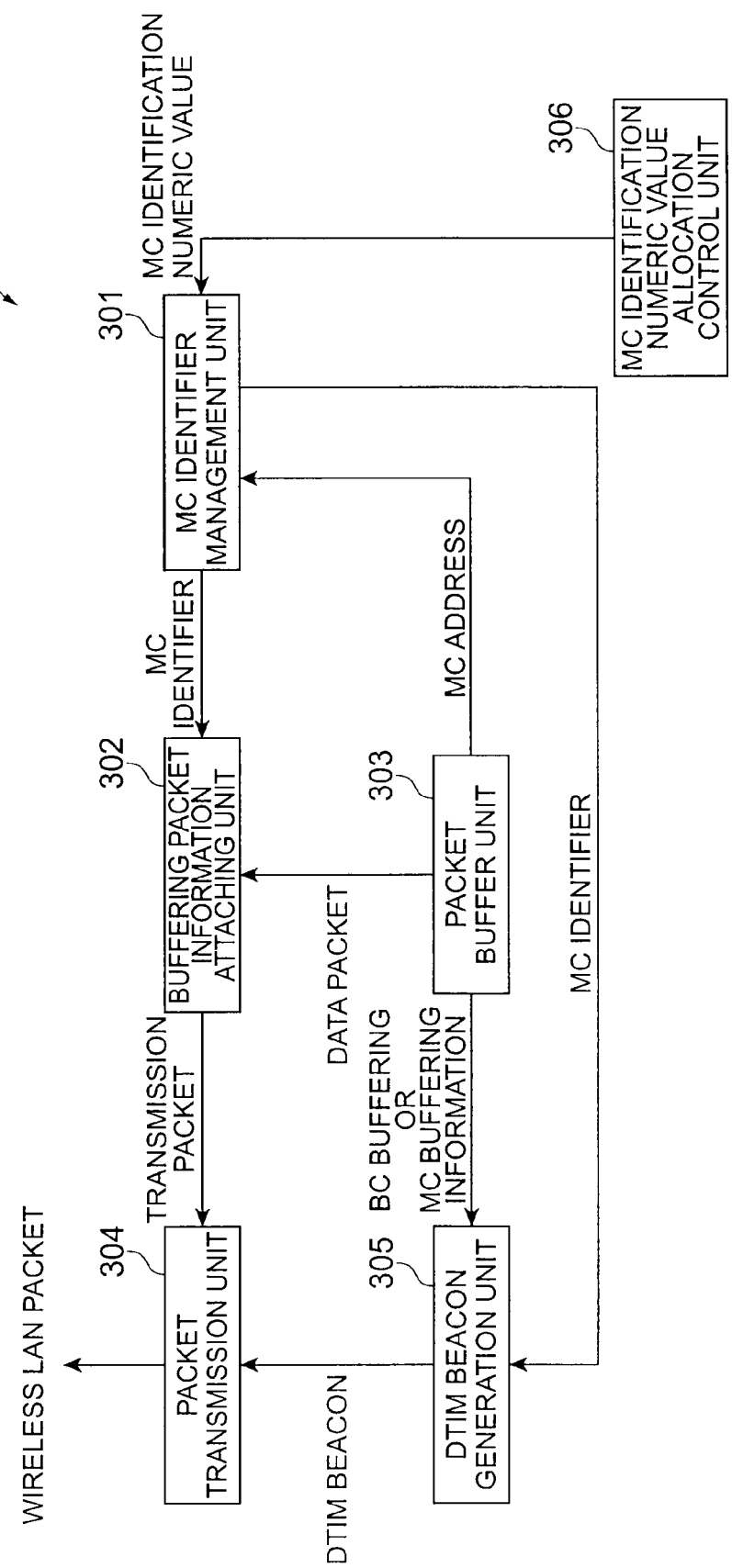
FIG. 8 is a diagram depicting a configuration of an access point according to an embodiment.

As FIG. 8 shows, the access point AP1 functionally has: an MC identifier management unit 301, a buffering packet information attaching unit 302, a packet buffer unit 303 (packet reception unit, buffering unit, buffering judgment unit), a packet transmission unit 304 (beacon transmission unit), DTIM beacon generation unit 305 (beacon generation unit), and an MC identification numeric value allocation control unit 306. The MC identification management unit 301 to MC identification numeric value allocation control unit 306 have functions implemented by the CPU 21, executing the above mentioned computer software stored in such a memory as ROM 22 and recording device 25, so as to operate each composing element of the access point AP1 shown in FIG. 7. The CPU 21 executes the processing which the access point AP1 performs, by executing the above mentioned computer software (in particular by using the MC identifier management unit 301 to MC identification numeric value allocation control unit 306).

When data to indicate an MC address notified by the wireless communication station STA1 (data to indicate an MC address of a multicast packet received by the wireless communication station STA1) is received from the packet buffer unit 303, the MC identifier management unit 301 allocates an MC identifier to this MC address, and stores this data to indicate the MC identifier in such a memory as RAM 23 and recording device 25, in correspondence with the MC address to which this MC identifier is allocated. When data to indicate an MC address of a multicast packet, which was received from the external communication network and buffered in such a memory as RAM 23 and recording device 25, is received from the packet buffer unit 303, the MC identifier management unit 301 judges whether the data to indicate the MC identifier associated with the MC address is stored in such a memory as RAM 23 and recording device 25 or not, acquires the data to indicate the MC identifier from such a memory as RAM 23 and recording device 25 only if it is judged that the data to indicate the MC identifier is stored, and sends this acquired data to indicate the MC identifier to the buffering packet information attaching unit 302 and DTIM beacon generation unit 305.

The MC identifier management unit 301 allocates an MC identifier using an MC identification numeric value which is supplied by the MC identification numeric value allocation control unit 306. The data to indicate this MC identification numeric value is stored in such a memory as ROM 22 and recording device 25. The MC identification numeric value allocation control unit 306 reads data to indicate accessible MC identification numeric values from such a memory as ROM 22 and recording device 25, and transfers it to the MC identifier management unit 301. The MC identifier management unit 301 stores this data to indicate the MC identifier in such a memory as RAM 23 and recording device 25 corresponding with the MC address (MC address of a multicast packet to which this MC identifier is allocated), and sends it to the buffering packet information attaching unit 302 and DTIM beacon generation unit 305, along with this data to indicate the MC address.

When the buffering packet information attaching unit 302 receives such a packet as a unicast packet, broadcast packet and multicast packet, received from the external communication network via the wireless communication device 24 from the packet buffer unit 303, and also receives data to indicate an MC identifier from the MC identifier management unit 301, the buffering packet information attaching unit 302 creates a transmission packet by attaching the data to indicate the MC identifier received from the MC identifier management unit 301 to the packet received from the packet buffer unit 303, and sends this transmission packet to the packet transmission unit 304.

The packet buffer unit 303 receives a broadcast packet and multicast packet from the external communication network via the wireless communication device 24, and buffers the received broadcast packet and multicast packet in such a memory as RAM 23 and recording device 25. The packet buffer unit 303 judges which of the unicast packet, broadcast packet and multicast packet the packet, which was received from the external communication network via the wireless communication device 24 and is buffered in such a memory as RAM 23 and recording device 25, is, and sends the data to indicate this judgment result (data to indicate buffering state) to the DTIM beacon generation unit 305. If the packet which was received from the external communication network via the wireless communication device 24 and is buffered in the wireless communication device 24 and recording device 25 is a multicast packet, the packet buffer unit 303 detects an MC address of this multicast packet from this packet, and sends it to the MC identifier management unit 301.

The packet transmission unit 304 sends a DTIM beacon which was generated by the DTIM beacon generation unit 305 and received by the DTIM beacon generation unit 305 to such a station as wireless communication station STA1 using the wireless communication device 24. After the DTIM beacon is sent, the packet transmission unit 304 sends the transmission packet received from the buffering packet information attaching unit 302 to such a station as wireless communication station STA1 using the wireless communication device 24.

The DTIM beacon generation unit 305 sets the data to indicate the buffering state, received from the packet buffer unit 303, in a DTIM beacon. For example, in the case when the packet buffer unit 303 judges that a packet buffered by the packet buffer unit 303 is a multicast packet, if the DTIM beacon generation unit 305 receives data on the buffering state indicating this judgment result from the packet buffer unit 303, the DTIM beacon generation unit 305 generates a DTIM beacon in which multicast notification data, to indicate that a multicast packet is buffered, is set. The DTIM beacon generation unit 305 sends the DTIM beacon, after the above mentioned various settings, to the packet transmission unit 304. The DTIM beacon generation unit 305 sets the multicast notification data in the DTIM beacon, using the No. 0 bit of the DTIM beacon to notify that a broadcast packet or multicast packet is buffered.

When data to indicate an MC address (a part or all of an address) is received from the packet buffer unit 303, the DTIM beacon generation unit 305 may set this data to indicate the MC address in the No. 1 to No. 2007 bit for AID of the DTIM beacon, and when data to indicate an MC identifier (e.g. "i") is received from the MC identifier management unit 301, the DTIM beacon generation unit 305 may set a bit (No. i bit) corresponding to the MC identifier out of No. 1 to No. 2007 bit(s) for AID of the DTIM beacon to "1". The DTIM beacon generation unit 305 may set the multicast notification data in this DTIM beacon by setting all the bits in the Length field 42 of the DTIM beacon (see FIG. 10) to "1".

Figure 10:
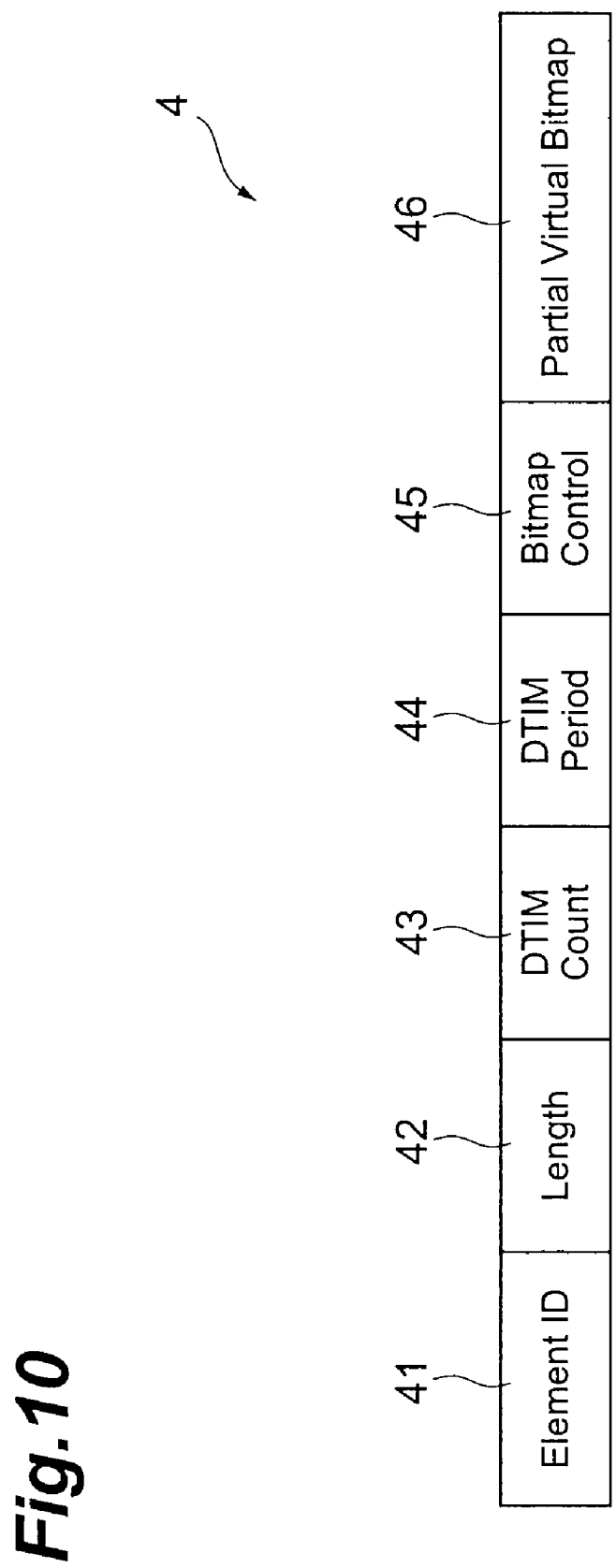
FIG. 10 is a diagram depicting a configuration of a TIM element of a DTIM beacon.

The data to notify that a multicast packet is buffered in the access point AP1 may be set in a DTIM beacon by a method other than the above mentioned method. For example, this data may be set in the Length field included in a TIM element of the DTIM beacon. FIG. 10 shows the content of the TIM element 4 of the DTIM beacon. As FIG. 10 shows, the TIM element 4 includes an Element-ID field 41, Length field 42, DTIM-Count field 43, DTIM-Period field 44, Bitmap-Control field 45 and Partial-Virtual-Bitmap field 46.

The data lengths of the Element-ID field 41 to Bitmap-Control field 45 are all 1 octet, and the data length of the Partial-Virtual-Bitmap field 46 is 1 to 251 octet(s). In the Length field 42, a total (max. 254 octets) of the data lengths of the DTIM-Count field 43, DTIM-Period field 44, Bitmap-Control field 45 and Partial-Virtual-Bitmap field 46 is set, but a value up to 255 octets can be set. Therefore if 255 octets of data are set in the Length field 42 of the TIM element of a DTIM beacon, and "1" is set in the No. 0 bit for AID of this DTIM beacon, then this DTIM beacon shows that a broadcast packet is buffered in the access point AP1.

If a value other than 255 octets (a value not greater than 254) is set in the Length field 42 of the TIM element of a DTIM beacon, and "1" is set in the No. 0 bit for AID of this DTIM beacon, on the other hand, then this DTIM beacon shows that a broadcast packet is not buffered, but a multicast packet is buffered in the access point AP1.

The DTIM beacon may show that a broadcast packet is buffered in the access point AP1 when a value, other than 255 octets (a value not greater than 254), is set in the Length field 42 of the TIM element of the DTIM beacon, and "1" is set in the No. 0 bit for AID of this DTIM beacon, and the DTIM beacon may show that a broadcast packet is not buffered in the access point AP1, but a multicast packet is buffered when a value of 255 octets is set in the Length field 42 of the TIM element of the DTIM beacon, and "1" is set in the No. 0 bit for AID of this DTIM beacon.

As described above, when data to notify that a multicast packet is buffered in the access point AP1 is set in a DTIM beacon, the received beacon analysis unit 204 of the wireless communication station STA1 judges whether a multicast notification data is set in the DTIM beacon received by the packet reception unit 201 or not, based on whether all the bits in the Length field 42 of the DTIM beacon received by the packet reception unit 201 are set to "1".

Figure 9:
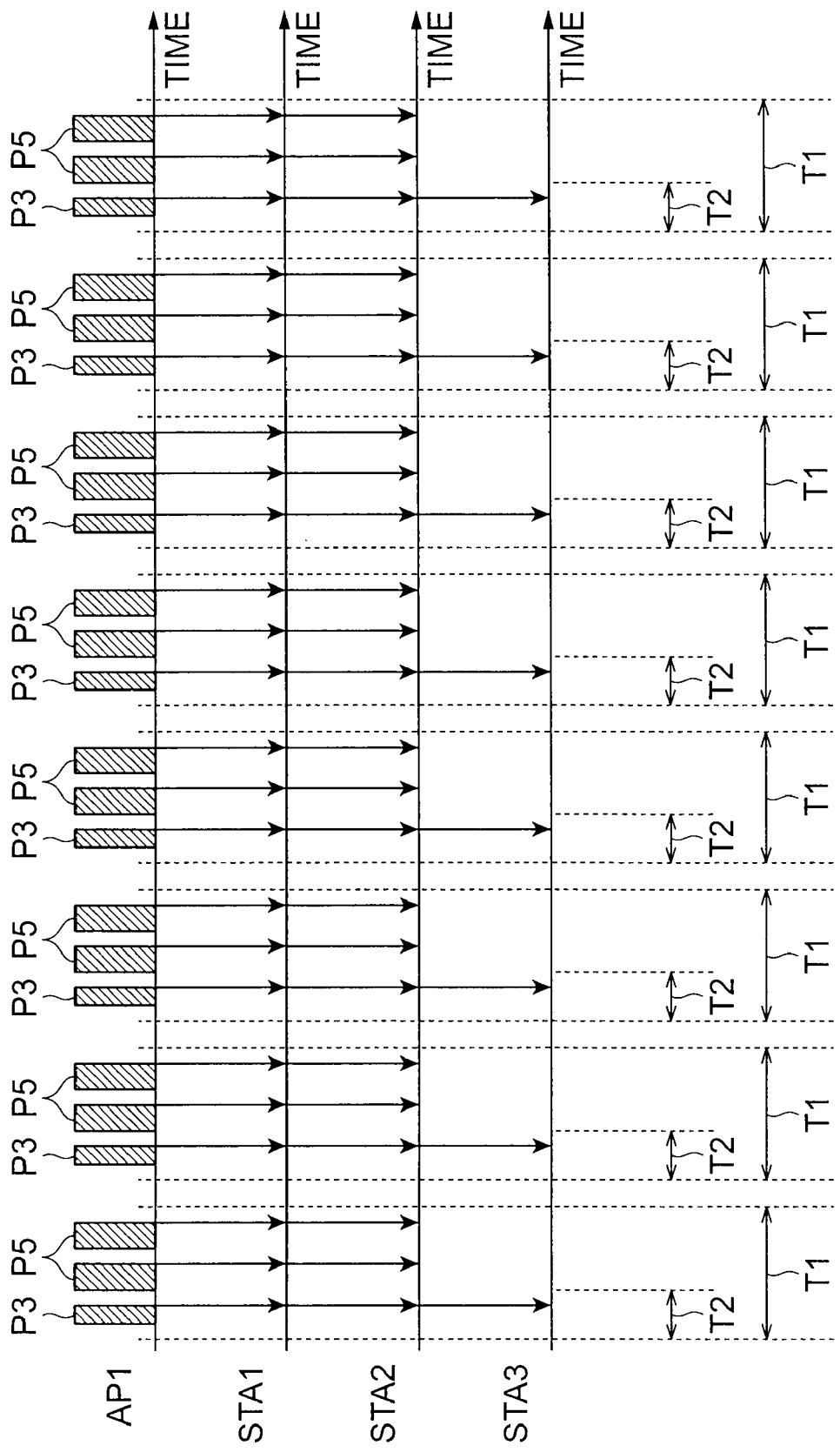
FIG. 9 is a timing chart depicting a state of transmission/reception of packets according to an embodiment.

The operation of the wireless communication system 100 according to the embodiment will now be described with reference to FIG. 9. FIG. 9 is a timing chart depicting the operation of the wireless communication system 100. The wireless communication stations STA1 and STA2 in FIG. 9 are set so as to receive multicast packets, and the wireless communication station STA3 is set so as not to receive multicast packets. When the access point AP1 transmits a DTIM beacon P3, each packet reception unit 201 of the wireless communication stations STA1, STA2 and STA3, which wokeup (started up) immediately before the transmission of this DTIM beacon P3, receive the DTIM beacon P3 via each wireless communication device 15 of the wireless communication stations STA1, STA2 and STA3, and each received beacon analysis unit 204 of the wireless communication stations STA1, STA2 and STA3 analyzes this DTIM beacon P3.

Here data which notifies that a broadcast packet is not buffered in the access point AP1, and that a multicase packet to be received by the wireless communication stations STA1 and STA2 is buffered in the access point AP1, is set in the DTIM beacon P3 shown in FIG. 9. For example, data "1", to indicate that a broadcast packet is not buffered in the access point AP1, and a multicast packet to be received by the wireless communication stations STA1 and STA2 is buffered in the access point AP1, is set in the No. 0 bit of the DTIM beacon P3 shown in FIG. 9. As mentioned above, the information, which a broadcast packet is not buffered in the access point AP1 and a multicast packet to be received by the wireless communication stations STA1 and STA2 is buffered in the access point AP1, may be judged by using the set value of the Length field of the TIM element of the DTIM beacon P3 (Length field 42 shown in FIG. 10).

Each received beacon analysis unit 204 of the wireless communication terminals STA1 and STA2 analyzes the DTIM beacon P3, and if it is recognized that the multicast packet P5, to be received by the wireless communication stations STA1 and STA2, is buffered in the access point AP1 as a result, each received beacon analysis unit 204 generates an Awake/Doze control instruction to maintain the Awake state of the wireless communication device 15 in order to receive this multicast packet P5, and sends it to each wireless LAN interface start control unit 203 of the wireless communication stations STA1 and STA2 respectively.

Each packet reception unit 201 of the wireless communication stations STA1 and STA2 receives a multicast packet P5 respectively from the access point AP1, and if each received MC packet analysis unit 202 of the wireless communication stations STA1 and STA2 judges that reception completed, then each packet reception unit 201 generates an Awake/Doze control instruction to set the wireless communication device 15 to Doze state, and sends it to each wireless LAN interface start control unit 203 of the wireless communication stations STA1 and STA2 respectively. In this way, each wireless LAN interface start control unit 203 of the wireless communication stations STA1 and STA2 maintains the wireless communication device 15 in Awake state during period T1 from the wakeup for receiving the DTIM beacon P3 from the access point AP1 to the completion of reception of the multicast packet P5.

If the received beacon analysis unit 204 of the wireless communication station STA3, which does not receive multicast packets, analyses the DTIM beacon P3 and recognizes that a broadcast packet is not buffered in the access point AP1, on the other hand, the received beacon analysis unit 204 generates an Awake/Doze control instruction to set the wireless communication device 15 to the Doze state, and sends this instruction to the wireless LAN interface start control unit 203 of the wireless communication station STA3. Then the wireless LAN interface start control unit 203 of the wireless communication station STA3 changes the wireless communication device 15 to Doze state after a period T2, in which the wireless communication device 15 is in the Awake state in order to receive the DTIM beacon P3 from the access point AP1.

Now the functions and effects of the access point AP1 according to the embodiment will be described. The access point AP1 is an access point to perform wireless communication (wireless LAN conforming to the IEEE 802.11 standard), with wireless communication stations STA1, STA2 and STA3, based on a packet transmission system which allocates wireless bands by CSMA/CA. The access point AP1 has a packet buffer unit 303, packet transmission unit 304 and DTIM beacon generation unit 305. The packet buffer unit 303 receives packets from an external communication network. The packet buffer unit 303 buffers a received packet in such a memory as RAM 23 and recording device 25. The packet buffer unit 303 judges whether the buffered packet is a multicast packet or not. The DTIM beacon generation unit 305 generates a DTIM beacon, in which multicast notification data, to indicate that a multicast packet is buffered, is set when the packet buffer unit 303 judges that the packet buffered by the packet buffer unit 303 is a multicast packet. The packet transmission unit 304 sends the DTIM beacon generated by the DTIM beacon generation unit 305 to the wireless communication stations STA1, STA2 and STA3.

In this way, whether the access point AP1 buffers a multicast packet or not can be judged depending on whether the multicast notification data is set in the DTIM beacon. Therefore if the wireless communication station STA1 does not receive a multicast packet, this wireless communication station STA1, which does not have to receive a multicast packet, can immediately shift from the drive state to the pause state if multicast data notification data is set in the DTIM beacon, hence power consumption can be decreased.

The DTIM beacon generation unit 305 may set the multicast notification data in the DTIM beacon using a predetermined bit (No. 0 for AID) of the DTIM beacon to indicate that a broadcast packet or a multicast packet is buffered (first mode). Since the multicast notification data is set using a predetermined bit of the DTIM beacon, the multicast notification data can be accessed if the wireless communication station, such as STA1, has a configuration conforming to the IEEE 802.11 standard, and as a result, whether a multicast packet is buffered in the access point AP1 or not can be judged using the multicast notification data.

In the above first mode, the DTIM beacon generation unit 305 may set the multicast notification data in this DTIM beacon using a bit for an AID (No. 1 to No. 2007 bit for AID) of the DTIM beacon (second mode). Since the multicast notification data is set using the bit for AID (to be precise, the No. 1 to No. 2007 bit for AID) of the DTIM beacon, multicast notification data, relatively large enough to specify a plurality of multicast packets respectively, can be used without involving a major change in frame format.

In the above mentioned second mode, the multicast notification data may include data to indicate a part or all of the MC address of the multicast packet buffered by the packet buffer unit 303. Since the MC address can be used for the multicast notification data, the multicast notification data can be easily created. Hence installation can be simplified and load can be decreased.

In the above mentioned second mode, the multicast notification data may include data to indicate a multicast ID (MC identifier) of which data volume is smaller than the data to indicate the MC address of the multicast packet, instead of the MC address. Since the ID data, of which data volume is smaller than the data to indicate the MC address, is used for the multicast notification data, the frame of the DTIM beacon can be shorter than the case of using an MC address.

In the above mentioned first mode, for the DTIM beacon generation unit 305 the multicast notification data may be set in the DTIM beacon using a predetermined field which is included in the DTIM beacon excluding the bit for AID (third mode). Since the multicast notification data is set using a predetermined field which is included in the DTIM beacon excluding the bit for AID, the multicast notification data can be set even if the AID bit is in use.

In the above mentioned third mode, the DTIM beacon generation unit 305 may set the multicast notification data in the DTIM beacon using the Length field 42 of a predetermined field which is included in the DTIM beacon excluding the bit for AID, or the DTIM beacon generation unit 305 may set the multicast notification data in the DTIM beacon by setting all the bits in the Length field 42 to "1". Since the multicast notification data is set using the Length field 42 of the DTIM beacon, the multicast notification data can be set without changing the frame format of the DTIM beacon.

Now the functions and effects of the wireless communication station STA1 according to the embodiment will be described. This description is the same for the wireless communication stations STA2 and STA3. The wireless communication station STA1 is a wireless communication station to perform wireless communication, with the access point AP1, based on a packet transmission system which allocates wireless bands by CSMA/CA (wireless LAN conforming to the IEEE 802.11 standard). The wireless communication station STA1 has a wireless LAN interface start control unit 203, packet reception unit 201 and received beacon analysis unit 204. The wireless LAN interface start control unit 203 sets the communication operation by the wireless communication device 15 in the wireless communication performed with the access point AP1 to the Awake state or Doze state. The packet reception unit 201 receives the DTIM beacon sent from the access point AP1, after the communication operation of the wireless communication device 15 becomes the Awake state by the wireless LAN interface start control unit 203. The received beacon analysis unit 204 judges whether the multicast notification data, to indicate that the multicast packet is buffered in the access point AP1, is set in the DTIM beacon received by the packet reception unit 201. Then the wireless LAN interface start control unit 203 sets the communication operation of the wireless communication device 15, after the packet reception unit 201 receiving the DTIM beacon continuously, to the Awake state, or to the Doze state, depending on the judgment result by the received beacon analysis unit 204.

In this way, whether the access point AP1 buffers a multicast packet or not can be judged by whether the multicast notification data is set in the DTIM beacon. Therefore if the wireless communication station STA1 does not receive a multicast packet, this wireless communication station STA1, which does not have to receive a multicast packet, can immediately shift from the drive state to the pause state, if the multicast notification data is set in the DTIM beacon, hence power consumption can be decreased.

The received beacon analysis unit 204 may judge whether multicast notification data is set or not in the DTIM beacon received by the packet reception unit 201 depending on whether all the bits in the Length field 42 of the DTIM beacon received by the packet reception unit 201 are set to "1" or not. In this way, the wireless communication station STA1, which does not receive a multicast packet, can easily judge whether the wireless communication device 15 is maintained in the Awake state or whether the wireless communication device 15 is set to the Doze state by referring to the Length field 42 of the DTIM beacon, hence power consumption can be decreased.

What is claimed is:

1. An access point for performing wireless communication with one or more wireless communication stations, based on a packet transmission system which allocates wireless bands by CSMA/CA, comprising:

packet reception unit that receives a packet from an external communication network;

buffering unit that buffers the packet received by the packet reception unit in a memory;

buffering judgment unit that judges whether the packet buffered by the buffering unit is a multicast packet or not;

beacon generation unit that generates a beacon, in which multicast notification data indicating that a multicast packet is buffered is set when the buffering judgment unit has judged that the packet buffered by the buffering unit is a multicast packet, the multicast notification data set to indicate that the one or more wireless communication stations to receive a multicast packet is to be shifted into a drive state and to indicate that the one or more wireless communications stations to not receive a multicast packet is to be shifted into a pause state; and beacon transmission unit that transmits the beacon generated by the beacon generation unit to the one or more of wireless communication stations.

2. The access point according to claim 1, wherein the beacon generation unit sets the multicast notification data in the beacon, using a predetermined bit of the beacon for indicating that a broadcast packet or a multicast packet is buffered.

3. The access point according to claim 2, wherein the beacon generation unit sets the multicast notification data in the beacon, using a bit for an association ID of the beacon.

4. The access point according to claim 3, wherein the multicast notification data includes data indicating a part or all of an address of a multicast packet buffered by the buffering unit, wherein one or more wireless communication stations not to receive a multicast packet of an address included in multicast notification data shifts to a pause state when receiving this multicast notification data.

5. The access point according to claim 3, wherein the multicast notification data includes multicast notification data of which data volume is smaller than data indicating an address of a multicast packet.

6. The access point according to claim 2, wherein the beacon generation unit sets the multicast notification data in the beacon, using a predetermined filed included in the beacon excluding the bit for the association ID.

7. The access point according to claim 6, wherein the beacon generation unit sets the multicast notification data in the beacon, using a Length field included in the beacon.

8. The access point according to claim 7, wherein the beacon generation unit sets the multicast notification data in the beacon by setting all the bits in the Length field to "1".

9. A wireless communication station for performing wireless communication with an access point, based on a packet transmission system which allocates wireless bands by CSMA/CA, comprising:
communication operation control unit that sets communication operation of the wireless communication performed with the access point to a drive state or a pause state;
beacon reception unit that receives a beacon transmitted from the access point after the communication operation is set to the drive state by the communication operation control unit; and
multicast judgment unit that judges whether multicast notification data indicating that a multicast packet is buffered by the access point is set in the beacon received by the beacon reception unit or not, the multicast notification data set to indicate that the wireless communication station to receive a multicast packet is to be shifted into a drive state and to indicate that the wireless communication station to not receive a multicast packet is to be shifted into a pause state,
wherein the communication operation control unit maintains or pauses the communication operation in the drive state after receiving the beacon by the beacon reception unit, according to the judgment result by the multicast judgment unit.

10. The wireless communication station according to claim 9, wherein the multicast judgment unit judges whether the multicast notification data is set in the beacon received by the beacon reception unit or not, based on whether all the bits are "1" in the Length field of the beacon received by the beacon reception unit.

11. A wireless communication system having an access point and one or more wireless communication stations, which perform wireless communication based on a packet transmission system which allocates wireless bands by CSMA/CA,
the access point comprising:
packet reception unit that receives a packet from an external communication network;
buffering unit that buffers the packet received by the packet reception unit in a memory;
buffering judgment unit that judges whether the packet buffered by the buffering unit is a multicast packet or not;
a beacon generation unit that generates a beacon, in which multicast notification data indicating that a multicast packet is buffered is set when the buffering judgment unit has judged that the packet buffered by the buffering unit is a multicast packet, the multicast notification data set to indicate that the one or more wireless communication stations to receive a multicast packet is to be shifted into a drive state and to indicate that the one or more wireless communications stations to not receive a multicast packet is to be shifted into a pause state; and
beacon transmission unit that transmits the beacon generated by the beacon generation unit to the one or more wireless communication stations,
the one or more wireless communication stations comprising:
communication operation control unit that sets communication operation of the wireless communication performed with the access point to a drive state or a pause state;
beacon reception unit that receives a beacon transmitted from the access point after the communication operation is set to the drive state by the communication operation control unit; and
multicast judgment unit that judges whether the multicast notification data, which indicates that a multicast packet is buffered by the access point, is set in the beacon received by the beacon reception unit or not,
wherein the communication operation control unit maintains or pauses the communication operation in the drive state after receiving the beacon by the beacon reception unit, according to the judgment result by the multicast judgment unit.

12. A wireless communication method for an access point to perform wireless communication with one or more wireless communication stations, based on a packet transmission system which allocates wireless bands by CSMA/CA, the method comprising:
a packet reception step in which the access point receives a packet from an external communication network of the access point;
a buffering step in which the access point buffers the packet received in the packet reception step in a memory of the access point;
a buffering judgment step in which the access point judges whether the packet buffered in the buffering step is a multicast packet or not;
a beacon generation step in which the access point generates a beacon, in which multicast notification data indicating that a multicast packet is buffered is set, when judgment is made that the packet buffered in the buffering step is a multicast packet in the buffering judgment step, the multicast notification data set to indicate that the one or more wireless communication stations to receive a multicast packet is to be shifted into a drive state and to indicate that the one or more wireless communications stations to not receive a multicast packet is to be shifted into a pause state; and a beacon transmission step in which the access point transmits the beacon generated in the beacon generation step to the one or more wireless communication stations.

13. A wireless communication method for a wireless communication station to perform wireless communication with an access point, based on a packet transmission system which allocates wireless bands by CSMA/CA, the method comprising:

a beacon reception step in which the wireless communication station receives a beacon transmitted from the access point when the communication operation of the wireless communication station in the wireless communication is a drive state;

a multicast judgment step in which the wireless communication station judges whether multicast notification data indicating that a multicast packet is buffered in the access point is set in the beacon received in the beacon reception step, the multicast notification data set to indicate that the wireless communication station to receive a multicast packet is to be shifted into a drive state and to indicate that the wireless communication station to not receive a multicast packet is to be shifted into a pause state; and a communication operation control step in which the wireless communication station maintains or pauses the communication operation in the drive state after the beacon is received in the beacon reception step, according to the judgment result in the multicast judgment step.

14. A wireless communication method for an access point and one or more wireless communication stations to perform wireless communication based on a packet transmission system which allocates wireless bands by CSMA/CA, the method comprising:

a packet reception step in which the access point receives a packet from an external communication network of the access point;

a buffering step in which the access point buffers the packet received in the packet reception step in a memory of the access point;

a buffering judgment step in which the access point judges whether the packet buffered in the buffering step is a multicast packet or not;

a beacon generation step in which the access point generates a beacon, in which multicast notification data indicating that a multicast packet is buffered is set when judgment is made that the packet buffered in the buffering step is a multicast packet in the buffering judgment step, the multicast notification data set to indicate that the one or more wireless communication stations to receive a multicast packet is to be shifted into a drive state and to indicate that the one or more wireless communications stations to not receive a multicast packet is to be shifted into a pause state;

a beacon transmission step in which the access point transmits the beacon generated in the beacon generation step to the one or more wireless communication stations;

a beacon reception step in which the wireless communication station receives a beacon transmitted from the access point when the communication operation of the wireless communication station in the wireless communication is in the drive state;

a multicast judgment step in which the wireless communication station judges whether the multicast notification data indicating that a multicast packet is buffered in the access point is set in the beacon received in the beacon reception step; and a communication operation control step in which the wireless communication station maintains or pauses the communication operation in the drive state after receiving the beacon in the beacon reception step, according to the judgment result in the multicast judgment step.

* * * * *